United States Patent [19]
Ohta

[11] Patent Number: 5,703,799
[45] Date of Patent: Dec. 30, 1997

[54] LOSSLESS TRANSFORM CODING SYSTEM FOR DIGITAL SIGNALS

[75] Inventor: Mutsumi Ohta, Tokyo, Japan

[73] Assignee: NEC Corporation, Tokyo, Japan

[21] Appl. No.: 668,046

[22] Filed: Jun. 17, 1996

[30] Foreign Application Priority Data

Jun. 16, 1995 [JP] Japan ................................. 7-174021

[51] Int. Cl.$^6$ .................................................. G06F 17/14
[52] U.S. Cl. .................................................. 364/725
[58] Field of Search ................................. 364/725–727; 382/281

[56] References Cited

U.S. PATENT DOCUMENTS

| | | | |
|---|---|---|---|
| 4,261,043 | 4/1981 | Robinson et al. | 364/725 |
| 5,293,434 | 3/1994 | Feig et al. | 364/725 |
| 5,619,270 | 4/1997 | Demmer | 364/727 |

FOREIGN PATENT DOCUMENTS 2-62993  12/1990  Japan .

*Primary Examiner*—Tan V. Mai
*Attorney, Agent, or Firm*—Foley & Lardner

[57] ABSTRACT

The invention provides a coding system and a decoding system wherein a discrete cosine transform which provides a high coding efficiency is approximated to allow reversible coding and decoding while maintaining the high coding efficiency and a system which includes such coding and decoding systems. Reversible coding is realized by multiplying a transform matrix by a fixed number for each row to approximate the transform matrix with integer values, performing requantization in a basic region defined by a multiple of a determinant for suppressing redundancy while maintaining a condition wherein reversible coding is possible in the basic region, and performing requantization for the entire region making use of the fact that such basic region appears periodically in a signal space.

3 Claims, 13 Drawing Sheets

ORIGINAL SIGNAL SPACE

SIGNAL SPACE AFTER TRANSFORM

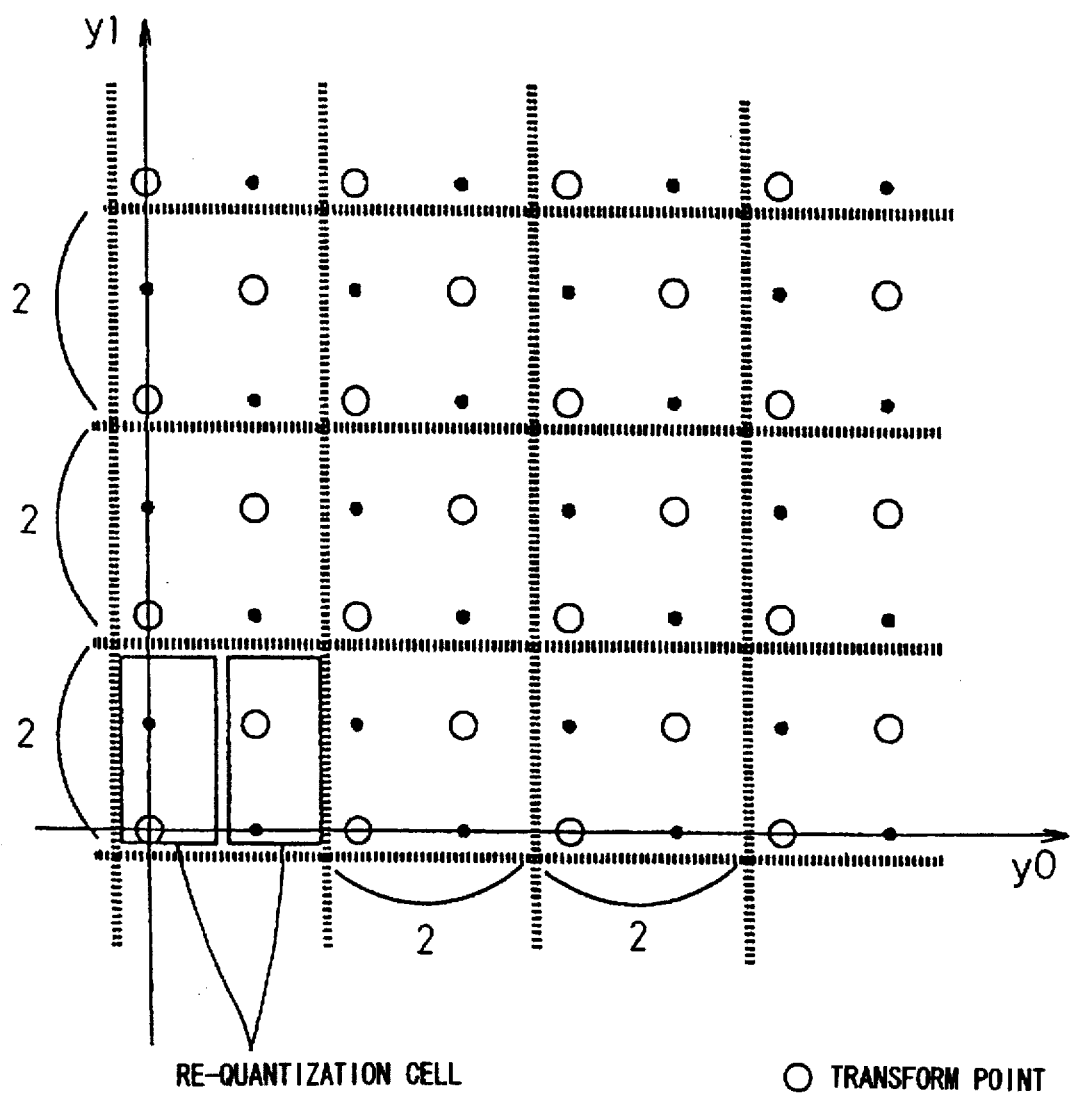

FIG. 4
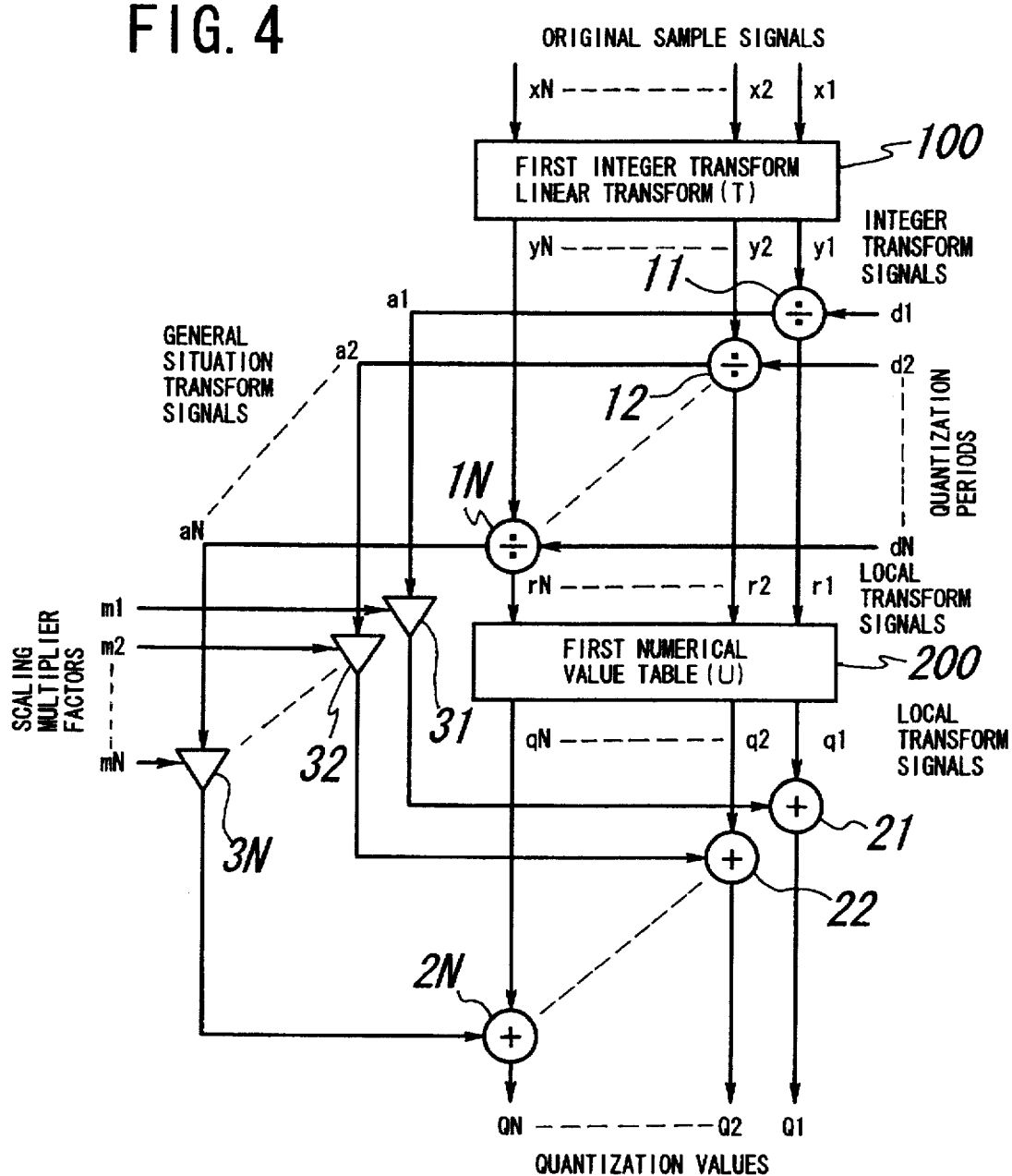
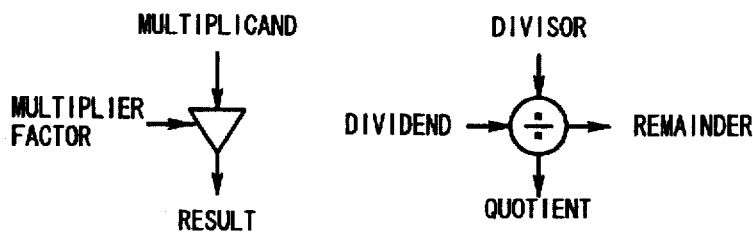

LOSSLESS TRANSFORM CODING SYSTEM FOR DIGITAL SIGNALS

BACKGROUND OF THE INVENTION

1. Field of the Invention

This invention relates to transform coding for digital signals, and more particularly to coding of audio signals or video signals.

2. Description of the Related Art

Conventionally, a linear transform coding system is known as a coding system for an audio or video signal. In the linear transform coding system, a plurality of samples obtained by sampling a signal are linearly transformed first and then coded, and depending upon a manner of selection of the base of the linear transform, compression coding can be achieved.

A best known transform coding system is discrete cosine transform (which may be hereinafter referred to simply as DCT) coding. It is known that the DCT achieves the highest compression coding of signals which conform to a highly correlated Markov maintenance model, and the DCT is utilized widely for international standardized systems. The DCT technique is disclosed in detail in K. R. Rao and P. Yip, "Discrete Cosine Transform Algorithms, Advantages, Applications", ACADEMIC PRESS, INC., 1990, translated into Japanese by Hiroshi Yasuda and Hiroshi Fujiwara, "Image Coding Technique", Ohm, 1992.

By the way, since the DCT is a transform which uses real numbers, coding (compression coding) by the DCT inevitably is non-reversible coding. In other words, lossless, reversible coding or distortion-free coding by which decoded signals accurately coincide with original signals is impossible with the DCT.

This will be described below with reference to FIG. 13 which illustrates a linear transform of a set of two digital signals.

Referring to FIG. 13, values which can be assumed by the original signals are represented as grating points on a two-dimensional space. Each of the grating points is called integer grating point of the original signals and is represented by a mark "○". Each of the integer grating points is considered to represent a region (called integer cell) delineated by solid lines.

The original signals are linearly transformed and quantized into integral values with a suitable step. The linear transform can be regarded as a coordinate transform, and integer grating points of original signals are also arranged in a grating-like arrangement with a different inclination and/or a grating width. However, the grating points are displaced by conversion into integers or quantization in the transform region.

In FIG. 13, a quantization grating point in the transform region is indicated by a mark "x", and a quantization cell in the transform region is indicated by broken lines.

As seen from FIG. 13, for example, an integer point A of the original signals is quantized to another point B by the transform, and returns to the point A by an inverse transform. In other words, a reversible transform is realized.

However, another quantization point C of the original signals is quantized to a further point D and is displaced to a different point E by the inverse transform. Consequently, the transform in this instance is non-reversible transform. Besides, the point E is transformed to a different point F and then inversely transformed to another different point G. This signifies that repetitions of coding and decoding progressively increase the difference between the original image and the transformed image, or in other words, the error is accumulated.

This phenomenon can be eliminated by reducing the quantization step size after a transform. However, the reduction of the quantization step size yields transformed quantization points which will not be transformed, and this is a reverse effect from the point of view of compression coding.

The reversible coding is a desired technique for some application fields. The reversible coding is desired, for example, for a television system for a business use which repeats dubbing more than ten times after an original picture is imaged until it is broadcast.

Hadamard transform is known as an example of transform coding which realizes reversible coding. A two-element Hadamard transform and inverse transform are given by the following expressions (1) and (2), respectively:

$$\begin{pmatrix} y1 \\ y2 \end{pmatrix} = \begin{pmatrix} 1 & 1 \\ -1 & 1 \end{pmatrix} \begin{pmatrix} x1 \\ x2 \end{pmatrix} \quad (1)$$

$$\begin{pmatrix} x1 \\ x2 \end{pmatrix} = \frac{1}{2} \begin{pmatrix} 1 & -1 \\ 1 & 1 \end{pmatrix} \begin{pmatrix} y1 \\ y2 \end{pmatrix} \quad (2)$$

In the two-element Hadamard transform given above, since the integer vector (x1, x2) is transformed into another integer vector (y1, y2), full reversible coding is possible. A four-element or eight-element Hadamard transform can be defined using the two-element Hadamard transform recurrently and still allows full reversible coding.

However, the Hadamard transform described above is also a redundant transform.

As can be seen from the expressions (1) and (2) above, y1 is the sum of x1 and x2, and y2 is the difference between x1 and x2. Accordingly, if y1 is an even number, also y2 is an even number, but if y1 is an odd number, then also y2 is an odd number. In other words, one half ones of transformed quantization points are redundant points which are not used.

A method removing the redundancy of the Hadamard transform is already known.

For example, Japanese Patent Publication No. Heisei 2-62993 (title of the invention: "Coding and Decoding Apparatus for Pixel Signals") discloses a method of eliminating the redundancy using the relationship between an odd number and an even number after a transform.

However, for any other transform coding than the Hadamard transform, a coding system which realizes reversible coding and eliminates the redundancy to such a degree that the coding system can be used sufficiently for practical use of compression coding.

Particularly for a discrete cosine transform (DCT) which is known in that it is high in transform efficiency among various transform coding methods, no method of performing reversible coding is known.

SUMMARY OF THE INVENTION

It is an object of the present invention to provide a coding system and a decoding system wherein a discrete cosine transform which provides a high coding efficiency is approximated to allow reversible coding and decoding while maintaining the high coding efficiency and a system which includes such coding and decoding systems.

In order to achieve the object described above, the present invention provides a reversible coding system wherein a transform matrix is multiplied by a fixed number for each row so as to round elements of the transform matrix into integer values and coding is performed using the resulting transform matrix. The present invention is described in detail below.

A two-element discrete cosine transform matrix is represented by the following expression (3):

$$\frac{1}{\sqrt{2}} \begin{pmatrix} 1 & 1 \\ 1 & 1 \end{pmatrix} \quad (3)$$

If each row of the expression (3) above is multiplied by $\sqrt{2}$, then it provides an Hadamard transform. This is a conventionally known method.

Meanwhile, a four-element discrete cosine transform matrix is, where Ci are given by the following expression (4)

$$Ci = \cos\left(\frac{i\pi}{16}\right) \quad (4)$$

represented by the following expression (5):

$$\frac{1}{\sqrt{2}} \begin{pmatrix} C4 & C4 & C4 & C4 \\ C2 & C6 & -C6 & -C2 \\ C4 & -C4 & -C4 & C4 \\ C6 & -C2 & C2 & -C6 \end{pmatrix} \quad (5)$$

If the first and third rows of the transform matrix of the expression (5) above are multiplied by $\sqrt{2}$ and the second and fourth rows are multiplied by $5\sqrt{2}$ and then individual resulting values are rounded into integers, such an integer matrix as given by the following expression (6)

$$\begin{pmatrix} 1 & 1 & 1 & 1 \\ 5 & 2 & -2 & -5 \\ 1 & -1 & -1 & 1 \\ 2 & -5 & 5 & -2 \end{pmatrix} \quad (6)$$

is obtained.

Where the expression (6) above is used for a transform, input signals of integers are transformed into integer output signals without fail. Accordingly, an operation to adjust integer values after the transform is not required. Consequently, such an error as described hereinabove with reference to FIG. 3 does not appear, and accordingly, the transform is a reversible transform.

Also for an eight-element discrete cosine transform, an integer approximate matrix can be produced in a similar manner. The resulting matrix is given by the following expression (7):

$$\frac{1}{\sqrt{2}} \begin{pmatrix} C4 & C4 & C4 & C4 & C4 & C4 & C4 & C4 \\ C1 & C3 & C5 & C7 & -C7 & -C5 & -C3 & -C1 \\ C2 & C6 & -C6 & -C2 & -C2 & -C6 & C6 & C2 \\ C3 & -C7 & -C1 & -C5 & C5 & C1 & C7 & -C3 \\ C4 & -C4 & -C4 & C4 & C4 & -C4 & -C4 & C4 \\ C5 & -C1 & C7 & C3 & -C3 & -C7 & C1 & -C5 \\ C6 & -C2 & C2 & -C6 & -C6 & C2 & -C2 & C6 \\ C7 & -C5 & -C3 & -C1 & C1 & C3 & C5 & -C7 \end{pmatrix} \quad (7)$$

By multiplying the first and fifth rows of the transform matrix of the expression (7) above by $\sqrt{2}$ and multiplying the remaining second, third, fourth, sixth, seventh and eighth rows by 10, the following expression (8) is obtained:

$$\begin{pmatrix} 1 & 1 & 1 & 1 & 1 & 1 & 1 & 1 \\ 5 & 4 & 3 & 1 & -1 & -3 & -4 & -5 \\ 5 & 2 & -2 & -5 & -5 & -2 & 2 & 5 \\ 4 & -1 & -5 & -3 & 3 & 5 & 1 & -4 \\ 1 & -1 & -1 & 1 & 1 & -1 & -1 & 1 \\ 3 & -5 & 1 & 4 & -4 & -1 & 5 & -3 \\ 2 & -5 & 5 & -2 & -2 & 5 & -5 & 2 \\ 1 & -3 & 4 & -5 & 5 & -4 & 3 & -1 \end{pmatrix} \quad (8)$$

On the other hand, by multiplying the first and fifth rows of the transform matrix of the expression (7) above by 2 $\sqrt{2}$, multiplying the third and seventh rows by 10 and multiplying the remaining second, fourth, sixth and eighth rows by 12, the following expression (9) is obtained:

$$\begin{pmatrix} 1 & 1 & 1 & 1 & 1 & 1 & 1 & 1 \\ 6 & 4 & 3 & 1 & -1 & -3 & -4 & -6 \\ 5 & 2 & -2 & -5 & -5 & -2 & 2 & 5 \\ 4 & -1 & -6 & -3 & 3 & 6 & 1 & -4 \\ 1 & -1 & -1 & 1 & 1 & -1 & -1 & 1 \\ 3 & -6 & 1 & 4 & -4 & -1 & 6 & -3 \\ 2 & -5 & 5 & -2 & -2 & 5 & -5 & 2 \\ 1 & -3 & 4 & -6 & 6 & -4 & 3 & -1 \end{pmatrix} \quad (9)$$

The second and third aspects of the present invention performs reversible coding using the expressions (8) and (9), respectively.

Reversible coding is allowed by the first, second and third aspects of the present invention described above. However, the transforms according to the aspects of the present invention are not very desirable from the point of view of compression coding.

The reason is that, since the coefficients of the matrix are multiplied by some values, some of integer grating points in a transform region are useless. The reason will be described in detail with reference to FIGS. 1(A) and 1(B).

Since the discrete cosine transform originally is a normalized orthogonal matrix transform and the determinant of it is 1, the density of integer grating points of original signals and the density of grating points (which will be hereinafter referred to as "transform points") in the transform region are equal to each other.

However, if the determinant D has a high value which is higher than 1 as in the first, second or third aspect of the present invention, then the density of transform points in the transform region is reduced to 1/D.

Consequently, some of integer grating points in the transform region do not correspond to quantization grating points of original signals as seen in FIGS. 1(A) and 1(B). In other words, some of the integer grating points do not make transform points.

1/D ones of the integer grating points in the transform region make transform points, but the remaining 1-1/D ones of the integer grating points are useless. Since also such useless integer grating points are subject to coding, the presence of them deteriorates the coding efficiency.

In order to solve the problem just described, according to the present invention, transform points on a transform region are formed as described below making use of the fact that they have a periodicity of the width D with respect to each variable axis.

First, re-quantization which allows reversible coding while suppressing redundancy is defined in a basic region of DxDx . . . around the origin. Then, making use of the periodicity of the definition, the definition is expanded to the full region.

This will be described with reference to FIG. 2 taking an Hadamard transform as an example for simplified description. Since the determinant of the matrix is D=2, transform points in the transform region have periodicity of 2 for each axis.

Thus, for transform signals y0 and y1, a region of $0 \leq y0 < 2$, $0 \leq y1 < 2$ is considered. The region has four integer points, but it has only two transform points. In other words, the density of transform points is 1/D=½.

Therefore, re-quantization is performed with the width of 2 in the y1 direction. Thus, a resulting requantization cell includes a single transform point, and no redundancy is involved. Upon inverse transform, if a transform point is determined from a re-quantization value, then the inverse transform can assure the reversibility. To this end, a numerical value table for determining a transform point from a re-quantization value should be provided.

While the operation just described is an operation for a basic region of 2×2 integer points, the operation can be expanded to the full region.

Further, the operation can be expanded also to a basic region of d0×d1 given by d0 and d1 which are multiples of D.

First, original signals x0, x1 are transformed to obtain y0, y1. Then, the transform signals y0, y1 are divided by d0 and d1 to obtain quotients a0, a1 and remainders r0, r1, respectively. The remainders r0, r1 are re-quantized as described above to obtain q0, q1, respectively. Then, the numbers into which the basic region is divided to the utmost for the individual axes by the re-quantization are represented by m0, m1.

In the case described above, m0=2, m1=1. From those values, final re-quantization values of the transform signals are calculated based on Q0=a0* m0+q0, Q1=a1*m1+q1.

As regards the re-quantization, it is important to divide the basic region with minimized wastefulness such that one transform point may be allocated to each of divisional regions (re-quantization cells). Naturally, some divisional region may not have a corresponding transform point, but it is desirable to minimize such divisional regions.

As an example, re-quantization where the basic region has 4×4 integer points in an Hadamard transform is examined.

The basic region has eight transform points as seen in FIG. 2. It is assumed that r0 and r1 are each divided into three by re-quantization. In this instance, one divisional region does not have a transform point. For the re-quantization, a suitable numerical value table is produced so that q0, q1 may be determined from r0, r1. This is the fourth aspect of the present invention.

For an inverse transform, a0, a1 are determined from quotients of divisions of Q0, Q1 by m0, m1 while q0, q1 are determined from remainders of the divisions, respectively. Then, using a numerical value table prepared in advance, r'0, r'1 are determined from q0, q1, and from those values, original transform signals are determined based on y'0= a0*d0+r'0, y'1=a1*d1+r'1. The original transform signals are transformed with an inverse transform matrix to determine x'0, x'1. This is the fifth aspect of the present invention.

The fifth aspect of the present invention can be simplified partially. In particular, results 10, 11 of an inverse linear transform of r'0, r'1 are determined directly from q0, q1 using a numerical value table, respectively, while a0*d0, a1*d1 are transformed by an inverse linear transform to obtain g0, g1, respectively, and then x0, x1 are determined based on x'0=10+g0, x'1=11+g1, respectively. This sixth aspect is equivalent to the fifth aspect, but is different a little in construction.

While, in the fourth aspect described above, q0, q1 are determined from the remainders r0, r1 using the numerical value table, this numerical value table is a redundant numerical value table. This is because the density of transform points is 1/D and only 1/D ones of all possible combinations of r0, r1 are significant (D is the determinant of the transform matrix).

Thus, the redundancy can be reduced by inputting, in place of a certain remainder ri, a quotient when the remainder r1 is divided by D to the numerical value table. This is the seventh aspect of the present invention.

If the second numerical value table used to determine r'0, r'1 from q0, q1 in the fifth aspect described above is replaced by an inverse numerical value table to the first numerical value table used in the fourth numerical value table, the fifth aspect of the present invention provides a complete inverse transform of the fourth aspect. This is the eighth aspect of the present invention.

If reversible coding is combined with the transform method employed in the transform system described in connection with the fourth aspect and the inverse transform system described hereinabove in connection with the eighth aspect is combined with decoding of such codes, then a reversible compression coding and decoding system is constructed. This is the ninth aspect of the present invention.

If the third numerical value table in the sixth aspect is replaced with a combination wherein the inverse numerical value table to the first numerical value table and the inverse linear transform in the fourth aspect, then also this makes a complete inverse transform to the fourth aspect. This is the tenth aspect of the present invention.

If reversible coding is combined with the transform system described hereinabove in connection to the fourth aspect and the inverse transform system described hereinabove in connection with the tenth aspect is combined with decoding of such codes, then a reversible compression coding and decoding system can be constructed. This is the eleventh aspect of the present invention.

Subsequently, simplification of the transform system based on a matrix which is employed in the first aspect of the present invention will be described below. This transform can be disintegrated into the following expressions (10) to (18):

$$\begin{pmatrix} x3+x0 \\ -x3+x0 \end{pmatrix} = \begin{pmatrix} 1 & 1 \\ -1 & 1 \end{pmatrix} \begin{pmatrix} x3 \\ x0 \end{pmatrix} \quad (10)$$

$$\begin{pmatrix} x2+x1 \\ -x2+x1 \end{pmatrix} = \begin{pmatrix} 1 & 1 \\ -1 & 1 \end{pmatrix} \begin{pmatrix} x2 \\ x1 \end{pmatrix} \quad (11)$$

$$\begin{pmatrix} y0 \\ y2 \end{pmatrix} = \begin{pmatrix} 1 & 1 \\ -1 & 1 \end{pmatrix} \begin{pmatrix} x1+x2 \\ x3+x0 \end{pmatrix} \quad (12)$$

$$\begin{pmatrix} y1 \\ y3 \end{pmatrix} = \begin{pmatrix} 5 & -2 \\ 2 & 5 \end{pmatrix} \begin{pmatrix} -x3+x0 \\ -x1+x2 \end{pmatrix} \quad (13)$$

Here, whether the intermediate result x0+x3 is even or odd coincides with whether x0−x3 is even or odd, and the even/odd of x1+x2 coincides with the even/odd of −x1+x2. Making use of this fact, such a circuit construction as shown in FIG. 9 may be applied. In particular, as seen in FIG. 10, x0+x3, x0−x3, x1+x2, −x1+x2 are calculated using a butterfly calculation, and for x0−x3 and −x1+x2, a transform by the fourth aspect which employs such a transform matrix as given by the following expression (14)

$$\begin{pmatrix} 5 & 2 \\ 2 & -5 \end{pmatrix} \quad (14)$$

is performed.

If x0–x3 and –x1+x2 are transformed and the information is maintained, then the even/odd number information of x0+x3, x1+x2 is unnecessary. Consequently, the least significant bits of x0+x3, x1+x2 are deleted and an Hadamard transform in accordance with the fourth aspect is performed. The transform system for four signals achieved in this manner is the twelfth aspect of the present invention.

For decoding in this instance, basically a processing flow reverse to that of the circuit construction of FIG. 9 is used. An example of a construction of a decoding circuit is shown in FIG. 10.

Referring to FIG. 10, such an inverse transform reverse to the transform as given by the following expression (15)

$$\begin{pmatrix} 5 & 2 \\ 2 & -5 \end{pmatrix} \quad (15)$$

is first performed from q1, q3 in accordance with the fifth or sixth aspect to obtain x0–x3, –x1+x2.

Then, from q0, q2 in accordance with the fifth or sixth aspect, such an inverse transform reverse to the transform as given by the following expression (16)

$$\begin{pmatrix} 1 & 1 \\ 1 & -1 \end{pmatrix} \quad (16)$$

is performed and then the least significant bits of x0–x3 and –x1+x2 mentioned above are added to the least significant bits of a result of the inverse transform to obtain x0+x3, x1+x2, respectively.

Then, the resulting values are butterfly calculated to obtain x0, x1, x2, x3. This is the thirteenth aspect of the present invention.

If the twelfth aspect, the thirteenth aspect, reversible coding and the decoding system are combined, then a compression reversible coding system can be constructed. This is the fourteenth aspect of the present invention.

Subsequently, simplification of the transform employed in the second aspect described above is performed. This transform is disintegrated into the following expressions (17) to (25):

$$\begin{pmatrix} x7+x0 \\ -x7-x0 \end{pmatrix} = \begin{pmatrix} 1 & 1 \\ -1 & 1 \end{pmatrix} \begin{pmatrix} x7 \\ x0 \end{pmatrix} \quad (17)$$

$$\begin{pmatrix} x6+x1 \\ -x6+x1 \end{pmatrix} = \begin{pmatrix} 1 & 1 \\ -1 & 1 \end{pmatrix} \begin{pmatrix} x6 \\ x1 \end{pmatrix} \quad (18)$$

$$\begin{pmatrix} x5+x2 \\ -x5+x2 \end{pmatrix} = \begin{pmatrix} 1 & 1 \\ -1 & 1 \end{pmatrix} \begin{pmatrix} x5 \\ x2 \end{pmatrix} \quad (19)$$

$$\begin{pmatrix} x4+x3 \\ -x4+x3 \end{pmatrix} = \begin{pmatrix} 1 & 1 \\ -1 & 1 \end{pmatrix} \begin{pmatrix} x4 \\ x3 \end{pmatrix} \quad (20)$$

$$\begin{pmatrix} x4+x3+x7+x0 \\ -x4-x3+x7+x0 \end{pmatrix} = \begin{pmatrix} 1 & 1 \\ -1 & 1 \end{pmatrix} \begin{pmatrix} x4+x3 \\ x7+x0 \end{pmatrix} \quad (21)$$

$$\begin{pmatrix} x5+x2+x6+x1 \\ -x5-x2+x6+x1 \end{pmatrix} = \begin{pmatrix} 1 & 1 \\ -1 & 1 \end{pmatrix} \begin{pmatrix} x5+x2 \\ x6+x1 \end{pmatrix} \quad (22)$$

$$\begin{pmatrix} x0 \\ x4 \end{pmatrix} = \begin{pmatrix} 1 & 1 \\ -1 & 1 \end{pmatrix} \begin{pmatrix} x4+x3+x7+x0 \\ x5+x2+x6+x1 \end{pmatrix} \quad (23)$$

$$\begin{pmatrix} x6 \\ x2 \end{pmatrix} = \begin{pmatrix} 5 & 2 \\ -2 & 5 \end{pmatrix} \begin{pmatrix} -x4-x3+x7+x0 \\ -x5-x2+x6+x1 \end{pmatrix} \quad (24)$$

$$\begin{pmatrix} x1 \\ x7 \\ x3 \\ x5 \end{pmatrix} = \begin{pmatrix} 5 & 1 & 4 & 3 \\ 1 & -5 & -3 & 4 \\ 4 & -3 & -1 & -5 \\ 3 & 4 & -5 & 1 \end{pmatrix} \begin{pmatrix} -x7+x0 \\ -x4+x3 \\ -x6+x1 \\ -x5+x2 \end{pmatrix} \quad (25)$$

As shown in FIG. 11, after a butterfly calculation similarly as upon four-element transform, the least significant bits of x7+x0, x4+x3, x6+x1, x5+x2 are deleted, and further, after a butterfly calculation for a next stage, the least significant bits of x7+x0+x4+x3, x6+x1+x5+x2 are deleted.

An Hadamard transform using the fourth aspect described hereinabove is performed for x7+x0+x4+x3, x6+x1+x5+x2, and for x7+x0–x4–x3, x6+x1–x5–x2, another transform of the next expression (26)

$$\begin{pmatrix} 5 & 2 \\ 2 & -5 \end{pmatrix} \quad (26)$$

using the fourth aspect described above is performed.

Further, for –x7+x0, –x4+x3, –x8+x1, –x5 +x2, a further transform of the following expression (27)

$$\begin{pmatrix} 5 & 1 & 4 & 3 \\ 1 & -5 & -3 & 4 \\ 4 & -3 & -1 & -5 \\ 3 & 4 & -5 & 1 \end{pmatrix} \quad (27)$$

using the fourth aspect described hereinabove is performed. This is the fifteenth aspect of the present invention.

For an inverse transform, as seen in FIG. 12, –x7+x0, –x4+x3, –x6+x1, –x5+x2 are calculated from q1, q7, q3, q5 using the fifth or sixth aspect described hereinabove by an inverse transform of the following expression (28):

$$\begin{pmatrix} 5 & 1 & 4 & 3 \\ 1 & -5 & -3 & 4 \\ 4 & -3 & -1 & -5 \\ 3 & 4 & -5 & 1 \end{pmatrix} \quad (28)$$

Further, from q6, q2, in accordance with the fifth or sixth aspect described above, x7+x0–x4–x3, x6+x1–x5–x2 are calculated by an inverse transform of the following expression (29):

$$\begin{pmatrix} 5 & 2 \\ -2 & 5 \end{pmatrix} \quad (29)$$

Then, from q0, q4, in accordance with the fifth or sixth aspect described hereinabove, an inverse transform to the Hadamard transform is performed, and the least significant bits of –x7+x0, –x4+x3 are added to the least significant bits of results of the butterfly calculation to obtain x7+x0, x4+x3, respectively.

Further, based on x7+x0+x4+x3, x7+x0 –x4–x3, a butterfly calculation is performed, and the least significant bits of –x7+x0, –x4+x3 are added to the least significant bits of results of the butterfly calculation to obtain x7+x4, x5+x2, respectively.

Similarly, a butterfly calculation is performed based on x6+x1+x5+x2, x7+x0–x5–x2, and the least significant bits of –x6+x1, –x5+x2 are added to the least significant bits of results of the butterfly calculation to obtain x6+x1, x5+x2, respectively.

Finally, a further butterfly calculation is performed based on –x7+x0, –x4+x3, –x6+x1, –x5+x2 to obtain x0, x1, x2, x3, x4, x5, x6, x7. This is the sixteenth aspect of the present invention.

A combination of the fifteenth aspect and the sixteenth aspect described hereinabove, reversible coding and the decoding system can provide a compression reversible coding system. This is the seventeenth aspect of the present invention.

The transform coding system according to the present invention described above is advantageous in that, since a transform matrix is converted into an integer matrix, reversible coding is achieved.

More particularly, with the first aspect of the present invention, an integer transform matrix which approximates a four-element discrete cosine transform is provided, and with the second and third aspects of the present invention, an integer transform matrix which approximates an eight-element discrete cosine transform.

With the fourth aspect of the present invention, redundancy upon transform with an integer matrix can be suppressed while maintaining the reversibility. Further, with the fifth and sixth aspects of the present invention, a fully reversible compression coding system wherein a signal transformed by the fourth aspect is inversely transformed to regenerate the original signal which fully coincides with the signal inputted to the transform means is provided.

Meanwhile, the seventh aspect of the present invention provides a method of suppressing the size of a numerical value table employed in the fourth aspect of the present invention. Further, the eighth aspect of the present invention provides conditions by which the inverse transform regeneration system of the fifth aspect of the present invention provides a complete inverse transform to the transform provided by the transform system of the fourth aspect of the present invention, and the ninth aspect of the present invention provides a fully reversible coding system, which employs the two systems.

Further, the tenth aspect of the present invention provides conditions by which the inverse transform regeneration system provided by the sixth aspect of the present invention provides a complete inverse transform to the transform provided by the transform system of the fourth aspect of the present invention, and the eleventh aspect of the present invention provides a fully reversible coding system.

Furthermore, the twelfth aspect of the present invention provides a simplified system which performs a reversible transform which approximates a four-element discrete cosine transform, and the thirteenth aspect of the present invention provides a simplified system which performs an inverse transform to the reversible transform.

With the fourteenth aspect of the present invention, a reversible coding/decoding system which approximates the four-element discrete cosine transform system is provided. With the fifteenth aspect of the present invention, a simplified system which performs reversible coding which approximates the eight-element discrete cosine transform system is provided. Further, with the sixteenth aspect of the present invention, a simplified system which performs an inverse transform to the last-mentioned reversible transform is provided. With the seventeenth aspect of the present invention, a reversible coding/decoding system which approximates the eight-element discrete cosine coding system is provided.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagrammatic view schematically illustrating an example of a definition of re-quantization in a 2×2 basic region by an Hadamard transform;

FIG. 4 is a block diagram showing a transformer to which the present invention is applied;

DESCRIPTION OF THE PREFERRED EMBODIMENTS

Figure 1A:
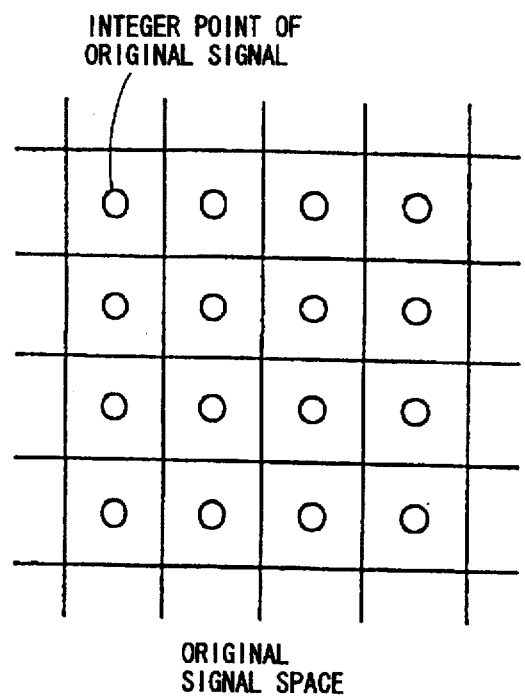
FIGS. 1(A) and 1(B) are diagrammatic views schematically illustrating how integer signals are distributed in a transform region taking an Hadamard transform as an example.
Figure 1B:
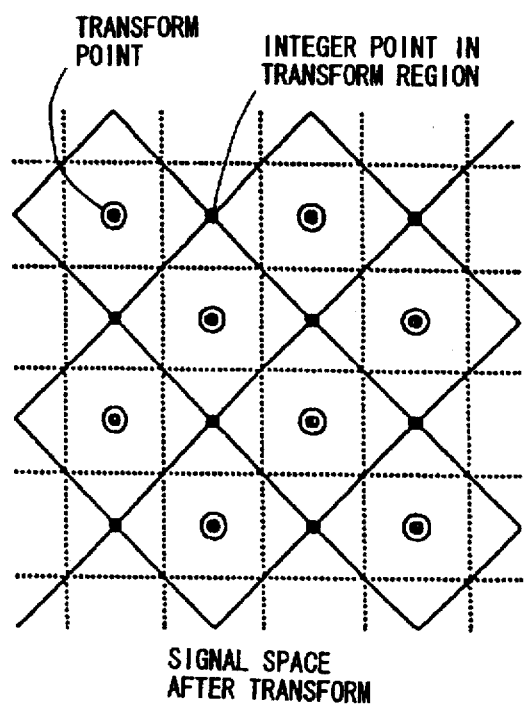
Figure 3:
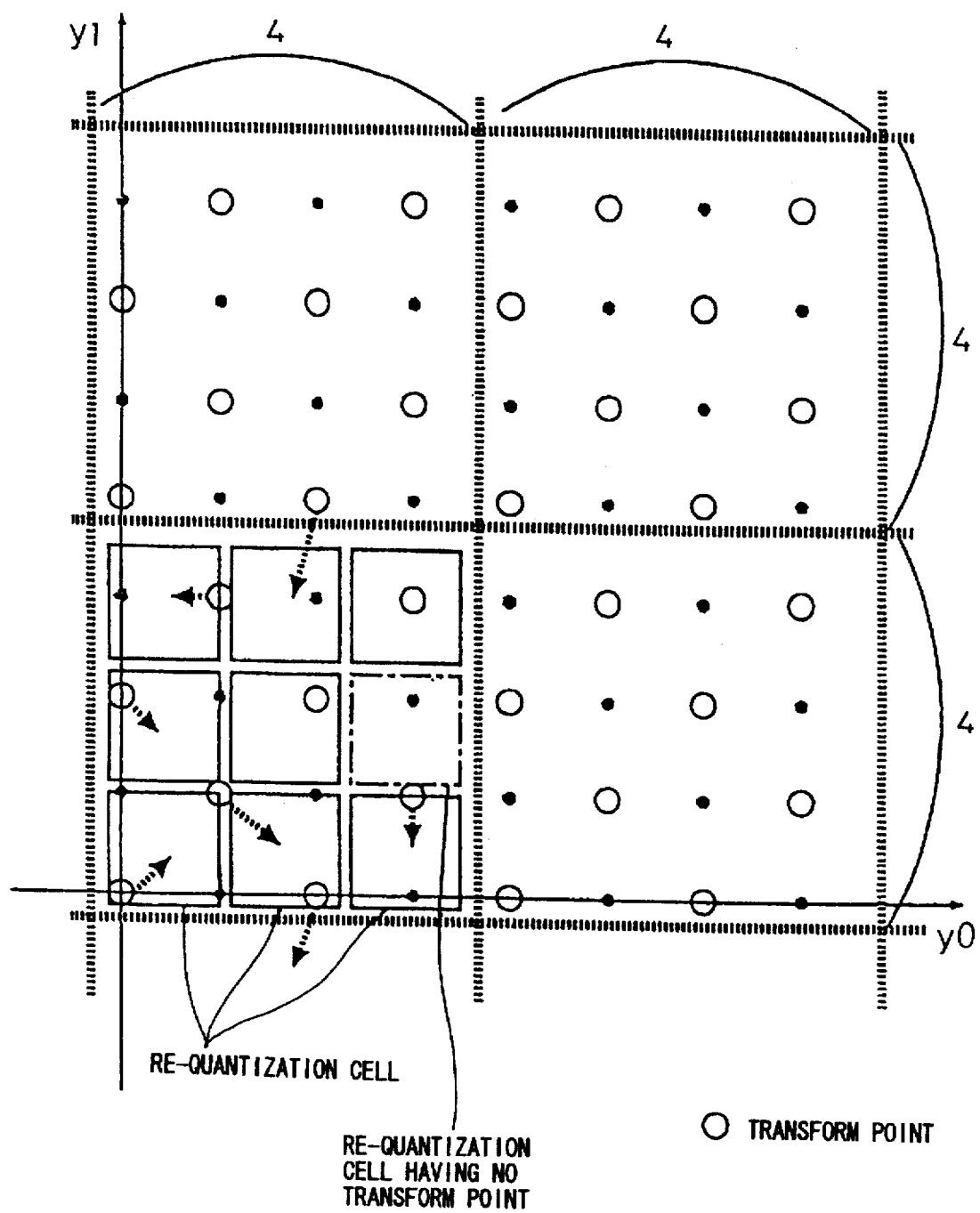
FIG. 3 is a diagrammatic view schematically illustrating an example of a definition of re-quantization in a 4×4 basic region by an Hadamard transform.

Several preferred embodiments of the present invention will be described below with reference to the accompanying drawings.

[Embodiment 1]

In the first embodiment of the present invention, as described hereinabove, a four-element discrete cosine transform is approximated with a matrix of the following expression (30):

$$\begin{pmatrix} 5 & 1 & 1 & 1 \\ 5 & 2 & -2 & -5 \\ 1 & -1 & -1 & 1 \\ 2 & -5 & 5 & -2 \end{pmatrix} \quad (30)$$

[Embodiment 2]

In the second embodiment of the present invention, as described hereinabove, an eight-element discrete cosine transform is approximated with a matrix of the following expression (31):

$$\begin{pmatrix} 1 & 1 & 1 & 1 & 1 & 1 & 1 & 1 \\ 5 & 4 & 3 & 1 & -1 & -3 & -4 & -5 \\ 5 & 2 & -2 & -5 & -5 & -2 & 2 & 5 \\ 4 & -1 & -5 & -3 & 3 & 5 & 1 & -4 \\ 1 & -1 & -1 & 1 & 1 & -1 & -1 & 1 \\ 3 & -5 & 1 & 4 & -4 & -1 & 5 & -3 \\ 2 & -5 & 5 & -2 & -2 & 5 & -5 & 2 \\ 1 & -3 & 4 & -5 & 5 & -4 & 3 & -1 \end{pmatrix} \quad (31)$$

[Embodiment 3]

In the third embodiment of the present invention, as described hereinabove, a transform matrix is given by the following expression (32):

$$\begin{pmatrix} 1 & 1 & 1 & 1 & 1 & 1 & 1 & 1 \\ 6 & 4 & 3 & 1 & -1 & -3 & -4 & -6 \\ 5 & 2 & -2 & -5 & -5 & -2 & 2 & 5 \\ 4 & -1 & -6 & -3 & 3 & 6 & 1 & -4 \\ 1 & -1 & -1 & 1 & 1 & -1 & -1 & 1 \\ 3 & -6 & 1 & 4 & -4 & -1 & 6 & -3 \\ 2 & -5 & 5 & -2 & -2 & 5 & -5 & 2 \\ 1 & -3 & 4 & -6 & 6 & -4 & 3 & -1 \end{pmatrix} \quad (32)$$

[Embodiment 4]

FIG. 4 shows a construction of a transform system of the fourth embodiment of the present invention.

Referring to FIG. 4, N (which is a predetermined positive integer) original sample signals x1, x2, . . . , xN each digitized and represented in an integer are inputted to a transformer (T) 100, from which N integer transform signals y1, y2, . . . yN are outputted, respectively. The N integer transform signals y1, y2, . . . yn are divided by N predetermined quantization periods d1 d2, . . . , dN formed from multiples of a transform determinant by N integer dividers 11, 12, . . . , 1N, from which N quotients are outputted as general situation transform signals a1, a2, . . . , aN and N remainders are outputted as local transform signals r1, r2, . . . , rN, respectively.

From the N local transform signals r1, r2, . . . , rN, N local quantization values q1, q2, . . . , qN are determined, respectively, based on a first numerical value table (U) 200. The first numerical value table (U) 200 may be formed from, for example, a ROM (read only memory), and a local quantization value stored in it may be read out using the local transform signals as a read address.

The N general situation transform signals a1, a2, . . . , aN are multiplied by predetermined N scaling multiplier factors m1, m2, . . . , mN by N multipliers 31, 32, . . . , 3N, respectively. The outputs of the N multipliers 31, 32, . . . , 3N are added to the N local quantization values q1, q2, . . . qN by N adders 21, 22, . . . , 2N to obtain N quantization values Q1, Q2, . . . , QN, respectively.

In the example of the Hadamard transform illustrated in FIG. 2, d1=d2=2, m1=1 and m2=1, and the first numerical value table (U) 200 is given as the following Table 1:

TABLE 1

| r1 | r2 | q1 | q2 |
|----|----|----|----|
| 0  | 0  | 0  | 0  |
| 1  | 0  | ND | ND |
| 0  | 1  | ND | ND |
| 1  | 1  | 1  | 0  |

In Table 1 above, "ND" represents an undefined term.

In the case of the Hadamard transform illustrated in FIG. 4, d1=d2=4, m1=3 and m2=3, and the first numerical value table (U) 200 is given as the following table 2:

TABLE 2

| r1 | r2 | q1 | q2 |
|----|----|----|----|
| 0 | 0 | 0 | 0 |
| 1 | 0 | ND | ND |
| 2 | 0 | 1 | -1 |
| 3 | 0 | ND | ND |
| 0 | 1 | ND | ND |
| 1 | 1 | 1 | 0 |
| 2 | 1 | ND | ND |
| 3 | 1 | 2 | 0 |
| 0 | 2 | 0 | 1 |
| 1 | 2 | ND | ND |
| 2 | 2 | 1 | 1 |
| 3 | 2 | ND | ND |
| 0 | 3 | ND | ND |
| 1 | 3 | 0 | 2 |
| 2 | 3 | ND | ND |
| 3 | 3 | 2 | 2 |

[Embodiment 5]

Figure 5:
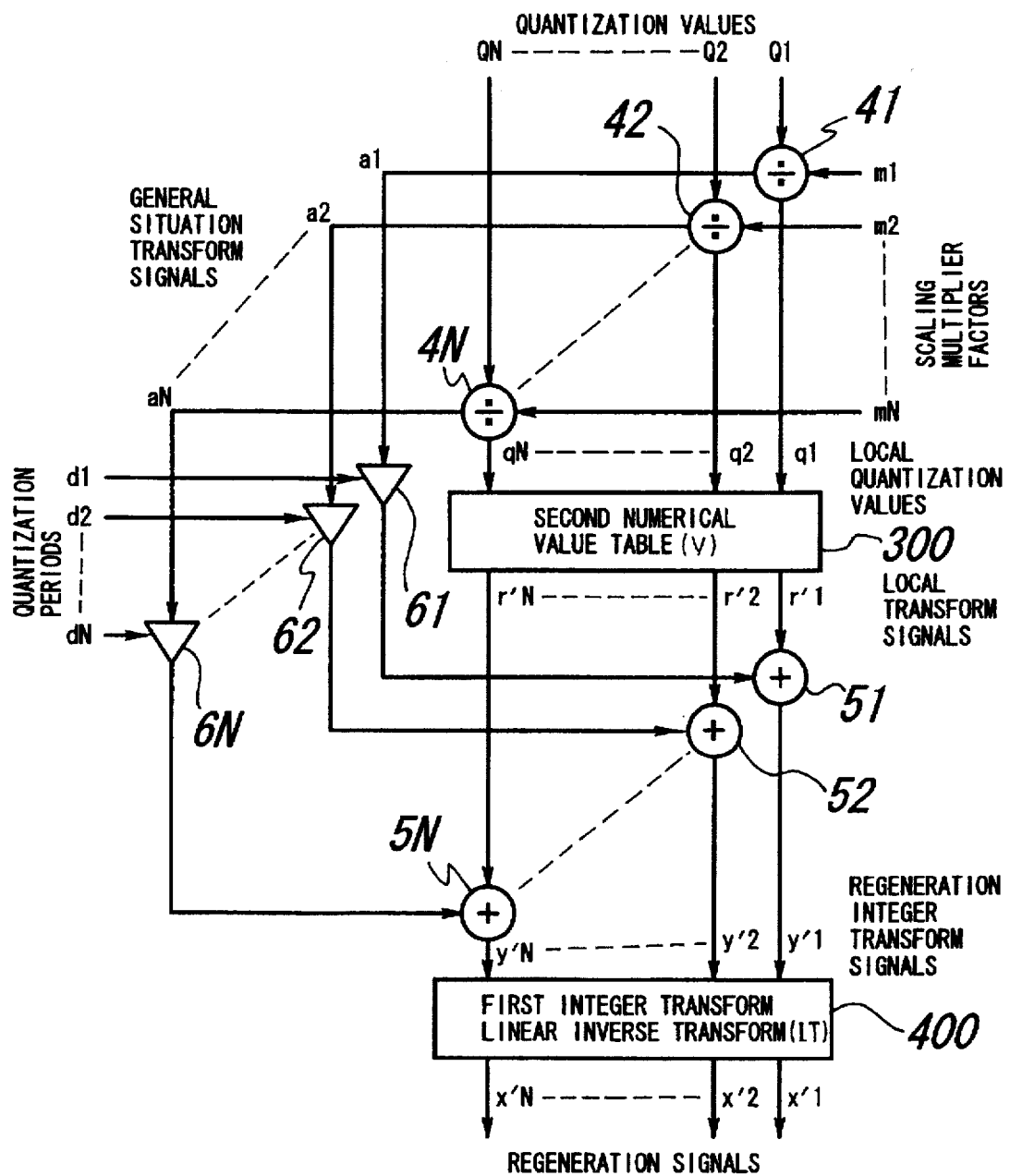
FIG. 5 is a block diagram showing an inverse transformer to which the present invention is applied.

FIG. 5 shows the transform system of the fifth embodiment of the present invention. The present embodiment is an inverse transform circuit which transforms quantization values into and outputs regeneration signals.

Referring to FIG. 5, N quantization values Q1, Q2, . . . , QN are divided by N scaling multiplier factors m1, m2, . . , mN by N integer dividers 41, 42, . . . , 4N, respectively. From the integer dividers 41, 42, . . . , 4N, N quotients are outputted as local quantization values q1, q2, . . . , qN while N remainders are outputted as general situation transform signals a1, a2, . . . , aN, respectively. A second numerical value table V (300) produces, from the N local quantization values q1, q2, . . . , qN, and outputs, N regeneration local transform signals r'1, r'2, . . . , r'N.

The contents of the second numerical value table (V) 300 are defined by the eighth aspect of the present invention described hereinabove.

The general situation transform signals a1, a2, . . . , aN are multiplied by quantization periods d1, d2, . . . , dN by multipliers 61, 62, . . . , 6N, respectively. The outputs of the multipliers 61, 62, . . . , 6N are added to the regeneration local transform signals r'1, r'2, . . . , r'N by adders 51, 52, . . . , 5N, respectively. Thus, regeneration integer transform signals y'1, y'2, . . . , y'N are obtained from the outputs of the adders 51, 52, . . . , 5N, respectively. The regeneration integer transform signals y'1, y'2, . . . , y'N are inputted to an inverse transformer (IT) 400 to obtain regeneration signals x'1, x'2, . . . , x'N, respectively.

[Embodiment 6]

Figure 6:
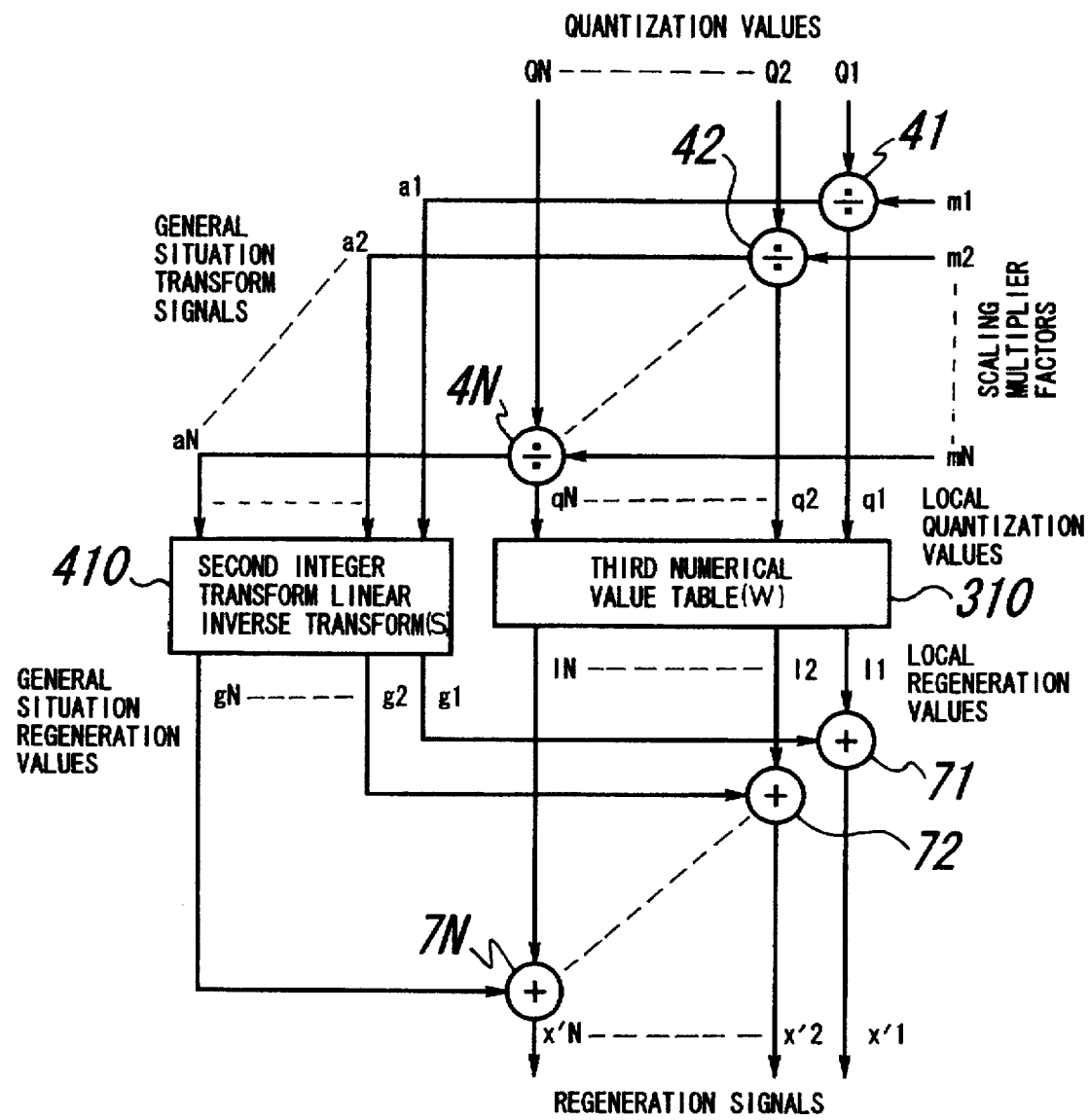
FIG. 6 is a similar view but showing another inverse transformer to which the present invention is applied.

FIG. 6 shows the construction of a transform system of the sixth embodiment of the present invention. Also the transform system is an inverse transform circuit which transforms quantization values into and outputs regeneration signals.

Referring to FIG. 6, N quantization values Q1, Q2, . . . , QN are divided by N scaling multiplier factors m1, m2, . . , mN by N integer dividers 41, 42, . . . , 4N, respectively. N quotients of the integer dividers 41, 42, . . . , 4N are outputted as local quantization values q1, q2, . . . , qN while N remainders are outputted as general situation transform signals a1, a2, . . . , aN, respectively.

A third numerical value table (W) 310 produces, from the N local quantization values q1, q2, . . . , qN, N local transform signals l1, l2, . . . , lN, respectively.

The third numerical value table (W) 310 is constructed such that the outputs thereof are equivalent to results of application of an inverse transform (IT) to the outputs of the second numerical value table (V) 300 employed in the fifth embodiment described above.

Meanwhile, the general situation transform signals a1, a2, ..., aN are transformed by a second linear transformer (S) 410 to obtain general situation regeneration signals g1, g2, ..., gN, respectively.

The linear transformer (S) 410 performs a transform of multiplying the outputs of the inverse transformer (IT) 400 employed in the fifth embodiment described above by a diagonal matrix of quantization periods d1, d2, ..., dN.

The local regeneration signals 11, 12, ..., 1N are added to the general situation regeneration signals g1, g2, ..., gN by adders 71, 72, ..., 7N to obtain regeneration signals x'1, x'2, ..., x'N, respectively.

[Embodiment 7]

Figure 7:
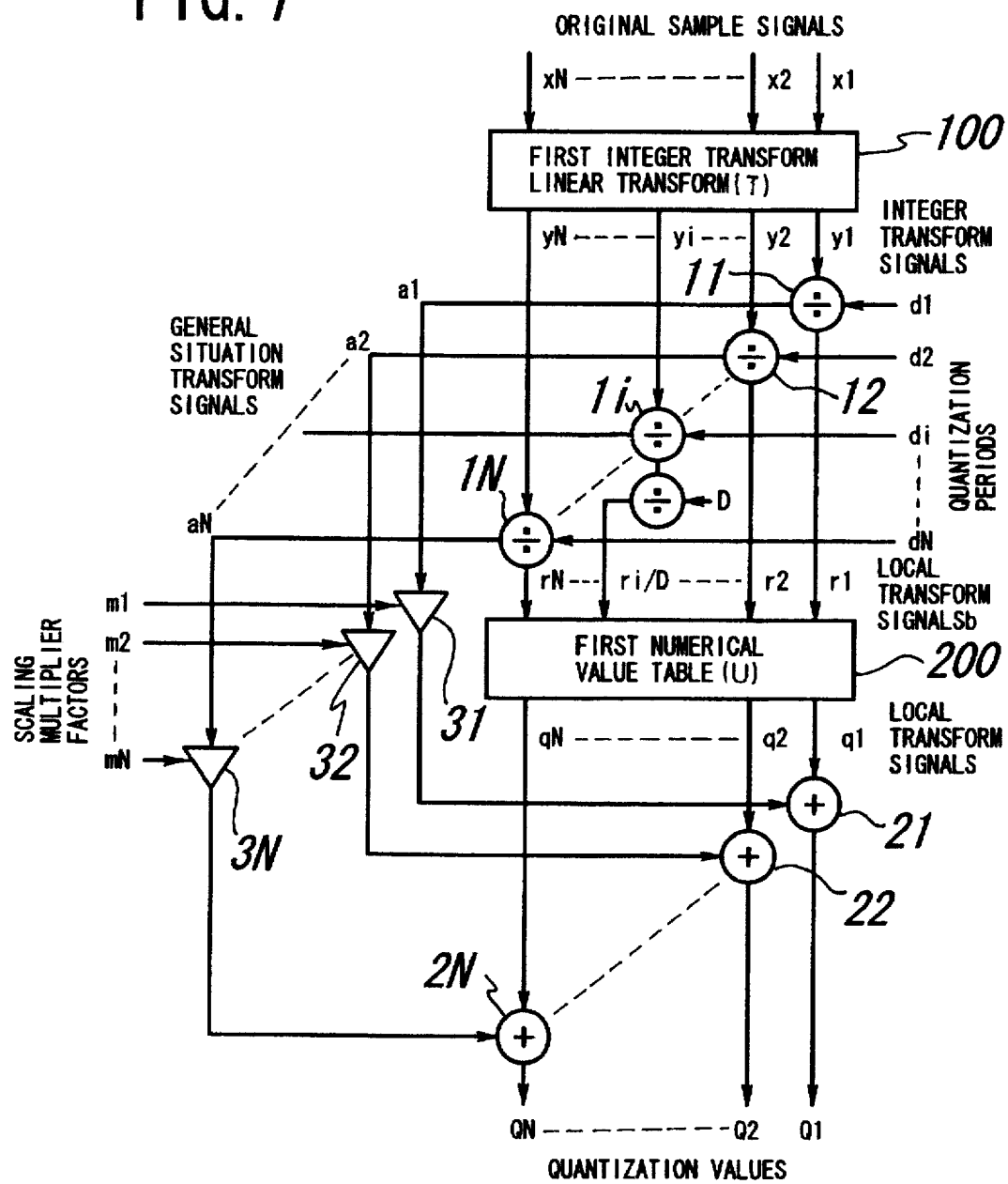
FIG. 7 is a block diagram showing another transformer to which the present invention is applied and which includes a numerical value table of a reduced scale.

FIG. 7 shows the construction of a transform system of the seventh embodiment of the present invention.

Referring to FIG. 7, the present embodiment is different from the fourth embodiment described hereinabove with reference to FIG. 4 in that the ith local transform signals ri are divided by the determinant D of the transform matrix of the first linear transform 100. For example, the first numerical value table U corresponding to FIG. 4 described hereinabove in connection with the fourth embodiment is, in the present embodiment, re-written as given below in Table 3 below as a result of the modification described above, and consequently, useless portions can be eliminated.

TABLE 3

| r1 | r2/2 | q1 | q2 |
|----|------|----|----|
| 0  | 0    | 0  | 0  |
| 1  | 0    | 1  | 0  |
| 2  | 0    | 1  | -1 |
| 3  | 0    | 2  | 0  |
| 0  | 1    | 0  | 1  |
| 1  | 1    | 1  | 0  |
| 2  | 1    | 1  | 1  |
| 3  | 1    | 2  | 2  |

[Embodiment 8]

The eighth embodiment of the present invention employs the numerical value table U employed in the fourth embodiment described above, that is, the complete inverse numerical value table to the first numerical table (U) 200, as the numerical value table of the fifth embodiment described hereinabove, that is, as the second numerical value table (V) 300, and assures a complete inverse transform.

[Embodiment 9]

Figure 8:
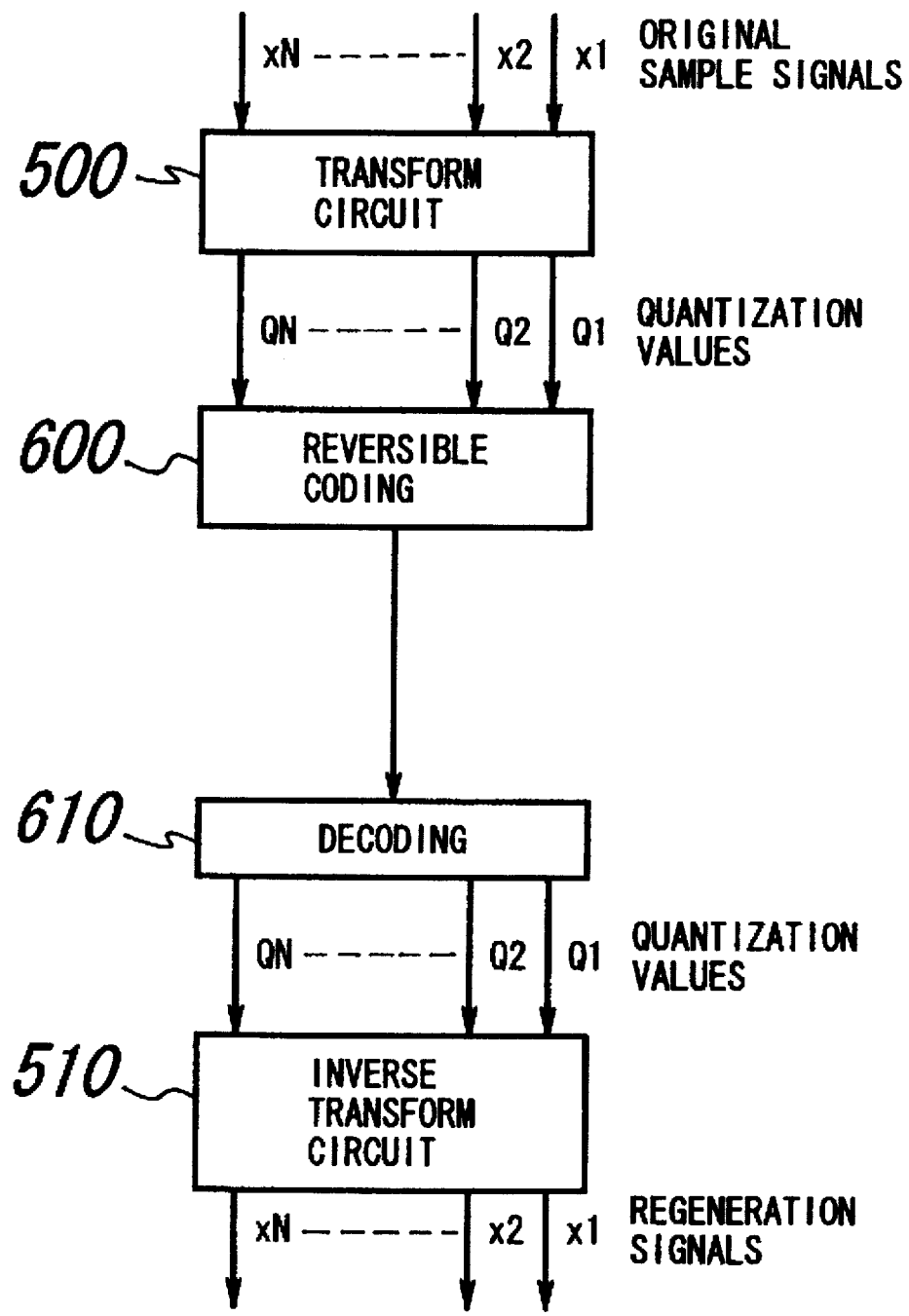
FIG. 8 is a system to which the present invention is applied and which performs variable coding and decoding.

FIG. 8 shows the construction of the ninth embodiment of the present invention.

Referring to FIG. 8, the transform circuit described hereinabove in connection with the fourth or seventh embodiment shown in FIG. 4 or 7 is used as a transform circuit 500 which receives original sample signals x1, x2, ..., xN as inputs thereto and outputs quantization values Q1, Q2, ..., QN. The quantization values Q1, Q2, ..., QN outputted from the transform circuit 500 are reversibly coded by Huffmann coding or arithmetic coding by a reversible coding circuit 600, and then reversible compression coding is performed.

On the other hand, decoding processing corresponding to the coding is performed by a decoding circuit 610. Then, quantization values Q1, Q2, ..., QN are outputted from the decoding circuit 610 and inverse transformed by an inverse transformer 510 which employs the eighth embodiment described above to obtain signals quite same as the original sample signals. The signals thus obtained are outputted as regeneration signals x1, x2, ..., xN.

[Embodiment 10]

The tenth embodiment of the present invention constructs the numerical value table employed in the sixth embodiment described above (the third numerical value table W) by applying an inverse linear transform to the complete inverse numerical value table to the numerical value table employed in the fourth embodiment described above (the first numerical value table U). The tenth embodiment thereby assures a full inverse transform.

[Embodiment 11]

The eleventh embodiment of the present invention is shown in FIG. 8 similarly to the ninth embodiment described hereinabove. Referring to FIG. 8, the present embodiment is different from the ninth embodiment described above in that the inverse transformer 510 employs, as its numerical value table, the numerical value table of the tenth embodiment described above.

[Embodiment 12]

Figure 9:
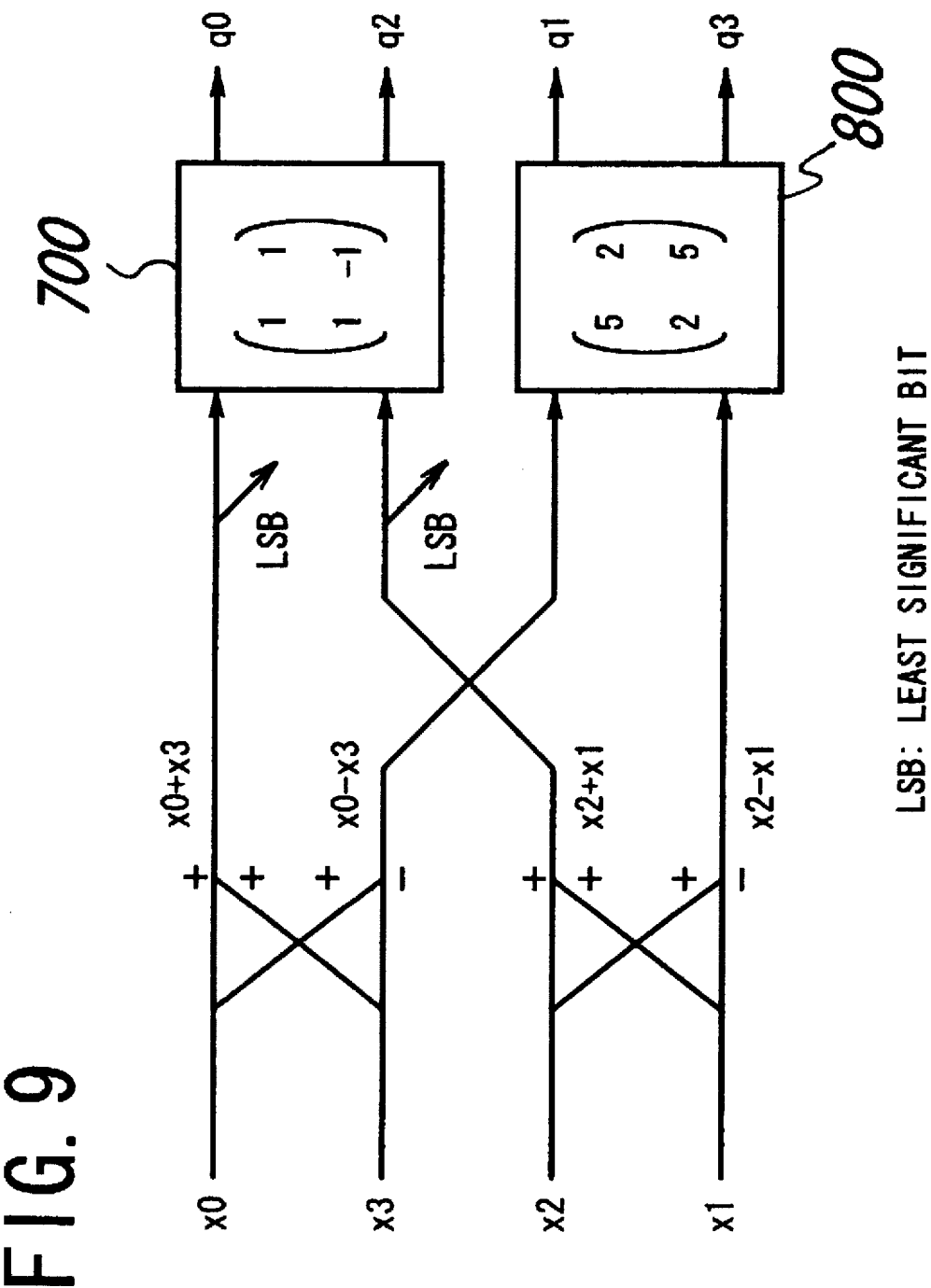
FIG. 9 is a diagrammatic view showing a transform system to which the present invention is applied and which has a simplified construction for reversible four-element discrete cosine transform.

The twelfth embodiment of the present invention is shown in FIG. 9. Referring to FIG. 9, the present embodiment employs a calculation method of the same type as that of a well known high speed calculation method of a four-element discrete cosign transform, but employs, for two butterfly calculations at the last stage, the transformers 700, 800 described hereinabove in connection with the fourth embodiment.

Further, in the present embodiment, the least significant bits of inputs to that one of the two transformers 700, 800 which performs on an Hadamard transform are removed.

[Embodiment 13]

Figure 10:
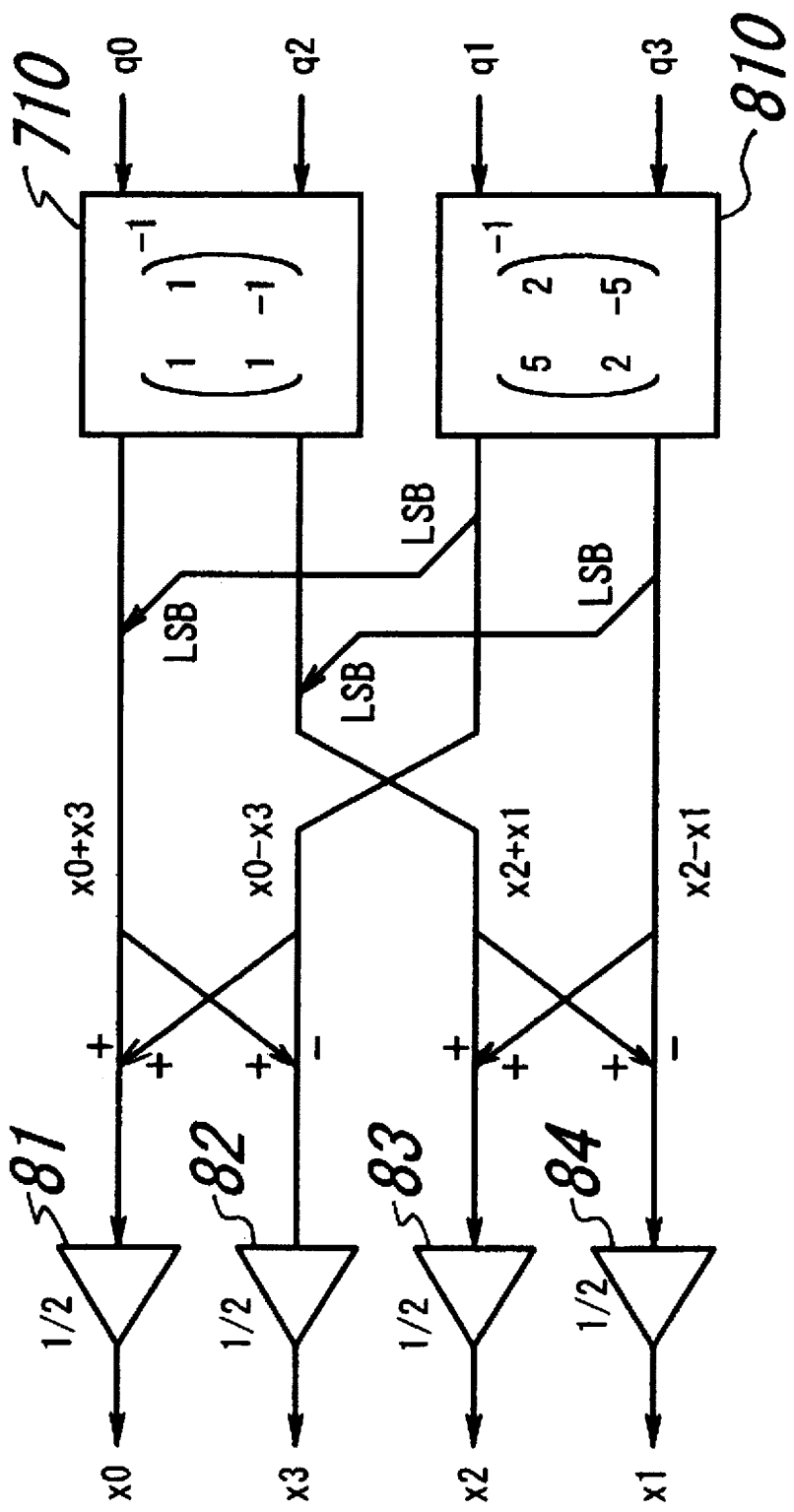
FIG. 10 is a similar view but showing an inverse transform system to which the present invention is applied and which has a simplified construction for reversible four-element inverse discrete cosine transform.

The third embodiment of the present invention is shown in FIG. 10. Referring to FIG. 10, also the present embodiment employs a calculation method of the same type as that of the well-known high speed calculation of a four-element inverse discrete cosine transform, but employs, for two butterfly calculations at the first stage, the inverse transformers 710, 810 described hereinabove in connection with the fifth or sixth embodiment.

Further, in the present embodiment, the least significant bits of two outputs of one of the inverse transformers are added to the least significant bits of two outputs of the other inverse transformer.

[Embodiment 14]

Figure 13:
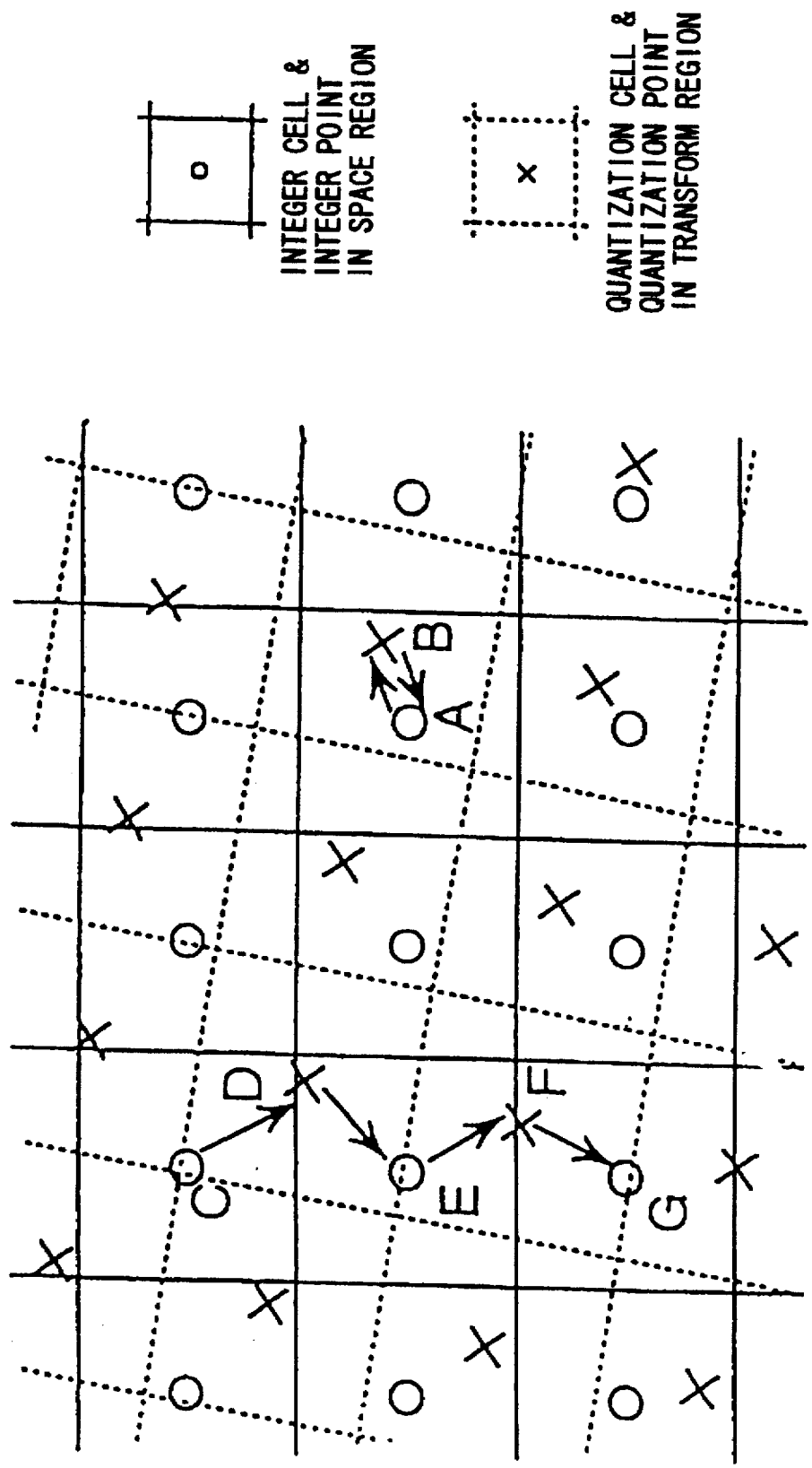
FIG. 13 is a diagrammatic view schematically illustrating a principle of a conventional discrete cosine transform by which reversible coding cannot be realized.

The fourteenth embodiment of the present invention is shown in FIG. 8 similarly to the ninth embodiment described hereinabove. The present embodiment is different from the ninth embodiment described hereinabove in that the transformer 700 has the construction of that of the twelfth embodiment described hereinabove in connection with FIG. 9 and the inverse transformer 710 has the construction of that of the thirteenth embodiment described hereinabove in connection with FIG. 13.

[Embodiment 15]

Figure 11:
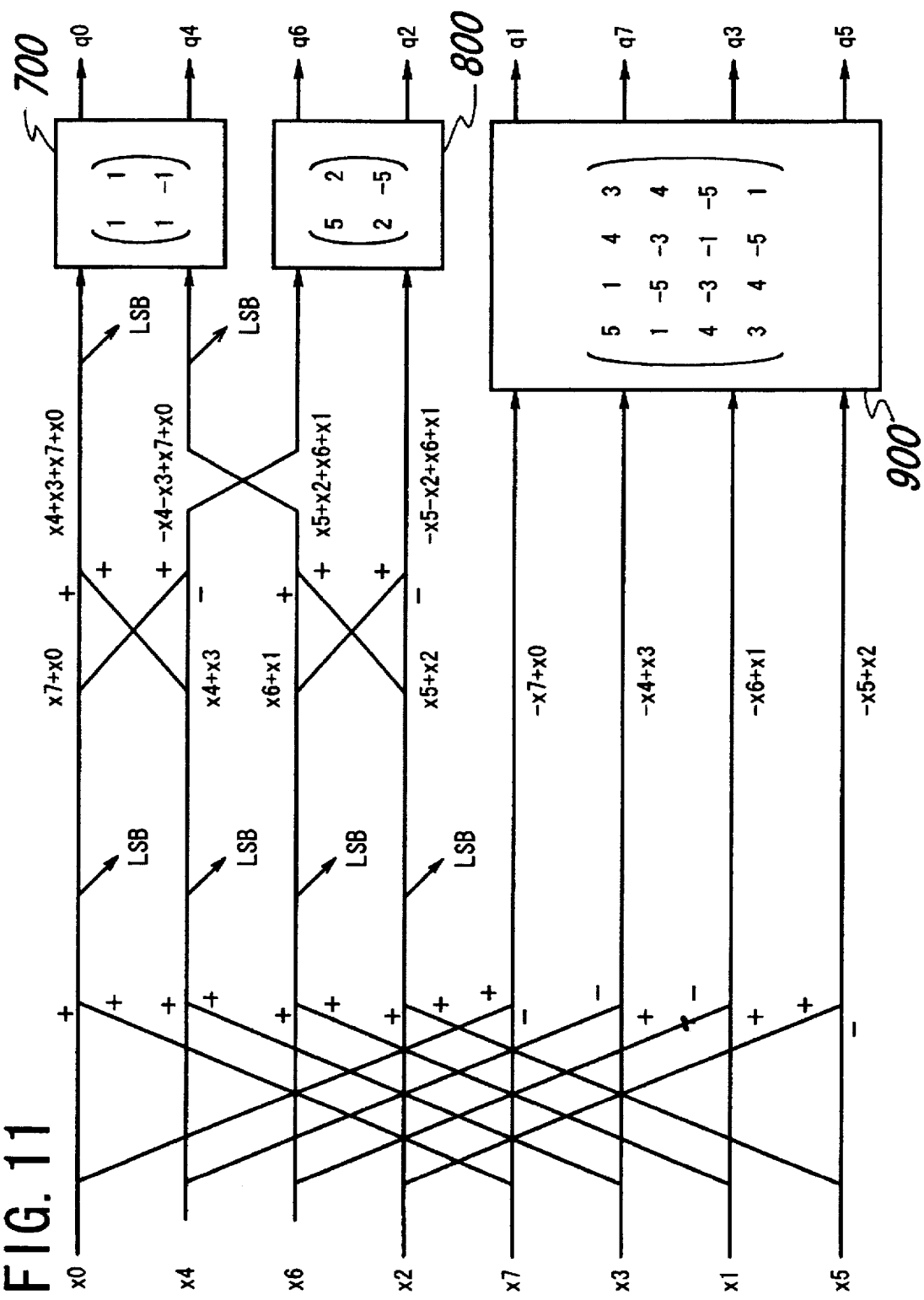
FIG. 11 is a similar view but showing another transform system to which the present invention is applied and which has a simplified construction for reversible eight-element discrete cosine transform.

The fifth embodiment of the present invention is shown in FIG. 11. In the present embodiment, similarly as in the twelfth embodiment described hereinabove, three butterfly calculations at the last stage are replaced by transformers 700, 800, 900 which employ the construction of that of the fourth embodiment described hereinabove. As seen in FIG. 11, totalling six least significant bits are deleted.

[Embodiment 16]

Figure 12:
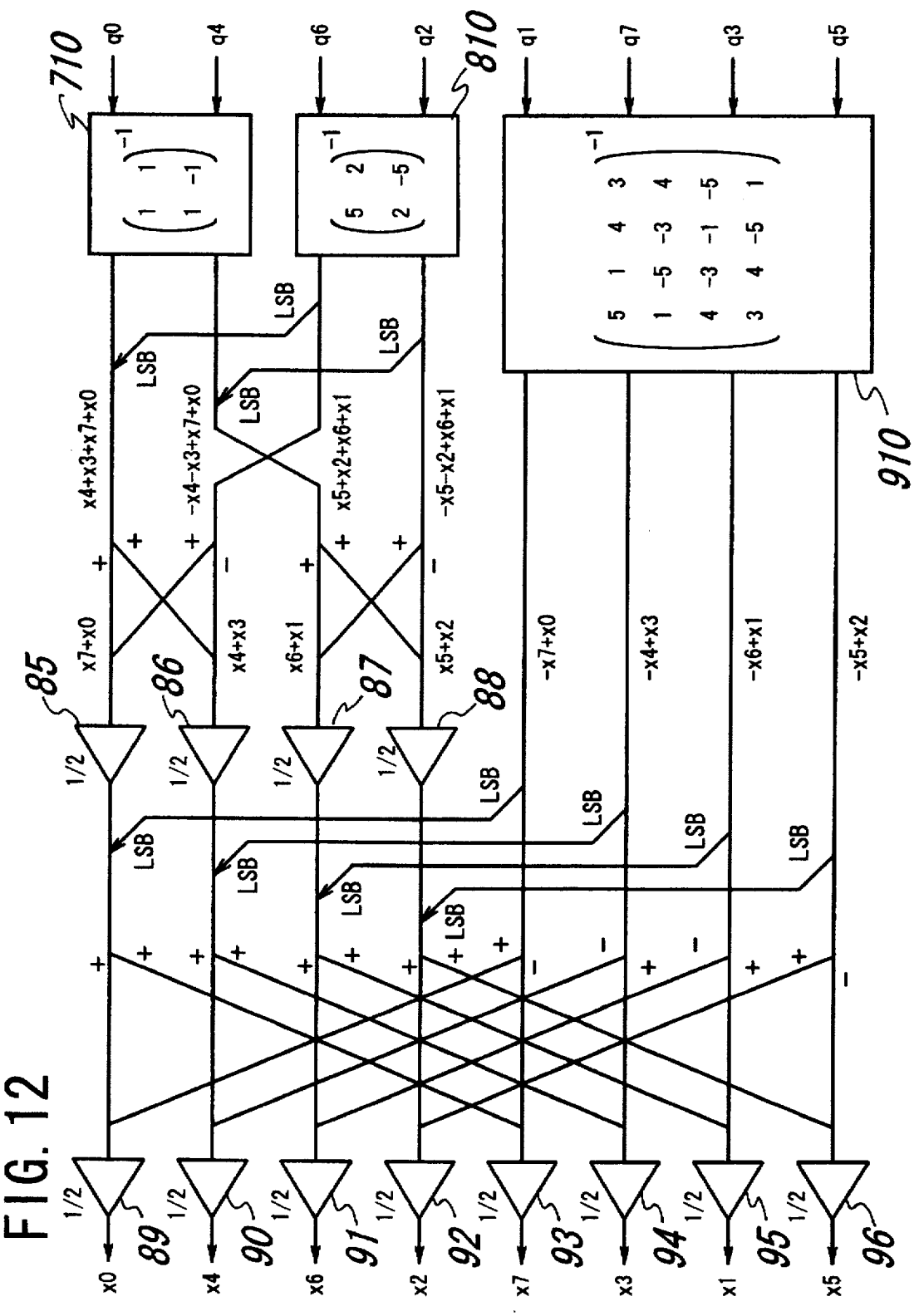
FIG. 12 is a similar view but showing another inverse transform system to which the present invention is applied and which has another simplified construction for reversible eight-element inverse discrete cosine transform.

The sixth embodiment of the present embodiment is shown in FIG. 12. In the present embodiment, similarly as in the thirteenth embodiment described hereinabove, three butterfly calculations at the first stage are replaced by inverse transformers 710, 810, 910 described hereinabove in connection with the fifth or sixth embodiment. Further, the least significant bits (LSBs) of predetermined six outputs are added to the least significant bits (LSBs) of the other outputs.

[Embodiment 17]

The seventeenth embodiment of the present invention is shown in FIG. 8 similarly to the ninth embodiment described hereinabove. The present embodiment is different from the ninth embodiment in that the transformer 700 has the construction of the twelfth embodiment described hereinabove in connection with FIG. 9 and the inverse transformer 710 has the construction of the thirteenth embodiment described hereinabove in connection with FIG. 10.

Having now fully described the invention, it will be apparent to one of ordinary skill in the art that many changes and modifications can be made thereto without departing from the spirit and scope of the invention as set forth herein.

What is claimed is:

1. A transform coding system for digital signals which performs a four-element discrete cosine transform, comprising:

means for approximating the four-element discrete cosine transform with an integer linear transform represented by a matrix of $$\begin{pmatrix} 1 & 1 & 1 & 1 \\ 5 & 2 & -2 & -5 \\ 1 & -1 & -1 & 1 \\ 2 & -5 & 5 & -2 \end{pmatrix}$$

and means for performing the four-element discrete cosine transform using the matrix.

2. A transform coding system for digital signals which performs an eight-element discrete cosine transform, comprising:

means for approximating the eight-element discrete cosine transform with an integer linear transform represented by a matrix of $$\begin{pmatrix} 1 & 1 & 1 & 1 & 1 & 1 & 1 & 1 \\ 5 & 4 & 3 & 1 & -1 & -3 & -4 & -5 \\ 5 & 2 & -2 & -5 & -5 & -2 & 2 & 5 \\ 4 & -1 & -5 & -3 & 3 & 5 & 1 & -4 \\ 1 & -1 & -1 & 1 & 1 & -1 & -1 & 1 \\ 3 & -5 & 1 & 4 & -4 & -1 & 5 & -3 \\ 2 & -5 & 5 & -2 & -2 & 5 & -5 & 2 \\ 1 & -3 & 4 & -5 & 5 & -4 & 3 & -1 \end{pmatrix}$$

and means for performing the eight-element discrete cosine transform using the matrix.

3. A transform coding system for digital signals which performs an eight-element discrete cosine transform, comprising:

means for approximating the eight-element discrete cosine transform with an integer linear transform represented by a matrix of $$\begin{pmatrix} 1 & 1 & 1 & 1 & 1 & 1 & 1 & 1 \\ 6 & 4 & 3 & 1 & -1 & -3 & -4 & -6 \\ 5 & 2 & -2 & -5 & -5 & -2 & 2 & 5 \\ 4 & -1 & -6 & -3 & 3 & 6 & 1 & -4 \\ 1 & -1 & -1 & 1 & 1 & -1 & -1 & 1 \\ 3 & -6 & 1 & 4 & -4 & -1 & 6 & -3 \\ 2 & -5 & 5 & -2 & -2 & 5 & -5 & 2 \\ 1 & -3 & 4 & -6 & 6 & -4 & 3 & -1 \end{pmatrix}$$

and means for performing the eight-element discrete cosine transform using the matrix.

* * * * *